2 Sheets—Sheet 1.

O. M. EDWARDS.

WINDOW.

No. 11,154. Reissued Mar. 24, 1891.

WITNESS:
D. C. Reusch
Gertrude Ward

INVENTOR
O. M. Edwards
BY A. M. Pierce.
ATTORNEY

THE NORRIS PETERS CO., PHOTO-LITHO., WASHINGTON, D. C.

2 Sheets—Sheet 2.

O. M. EDWARDS.

WINDOW.

No. 11,154. Reissued Mar. 24, 1891.

Witnesses:
Raphael Netter
Frank B. Murphy,

Inventor:
Oliver M. Edwards
by M. F. Newbury
Attorney.

THE NORRIS PETERS CO., PHOTO-LITHO., WASHINGTON, D. C.

UNITED STATES PATENT OFFICE.

OLIVER M. EDWARDS, OF JOHNSTOWN, NEW YORK.

WINDOW.

SPECIFICATION forming part of Reissued Letters Patent No. 11,154, dated March 24, 1891.

Original No. 421,563, dated February 18, 1890. Application for reissue filed July 1, 1890. Serial No. 357,422.

*To all whom it may concern:*

Be it known that I, OLIVER M. EDWARDS, a citizen of the United States, and a resident of Johnstown, in the county of Fulton and State of New York, have invented certain new and useful Improvements in Windows, of which the following is a specification.

My invention relates especially to devices employed for holding window-sashes closed or raised, and to mechanism for automatically raising the sash, and has for its object the provision of means whereby a sash may be easily and quickly released when closed down and caused to automatically raise to any desired position without the expenditure of force or exertion, as heretofore required.

To attain the desired end my invention consists, essentially, in the combination, with a sash connected with an actuating spring or springs or with weights, of a movable stop or stops adapted and arranged to hold the sash in any desired position; and my invention also involves certain other novel and useful combinations or arrangements of parts and peculiarities of construction and operation, all of which will be hereinafter first fully described, and then pointed out in the claims.

Figure 1:
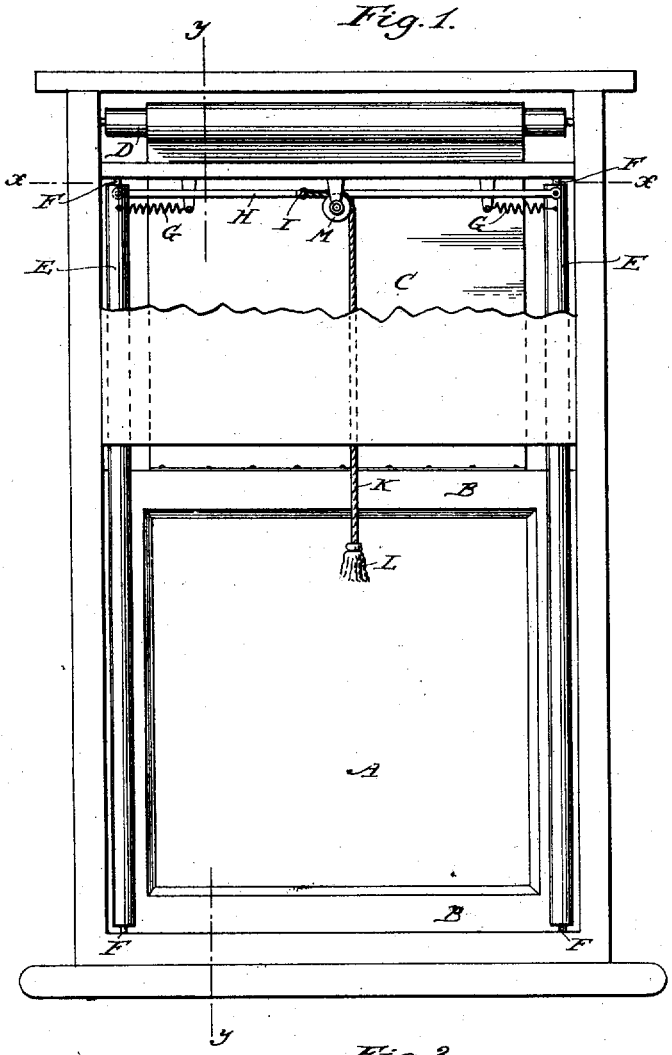
Figure 2:
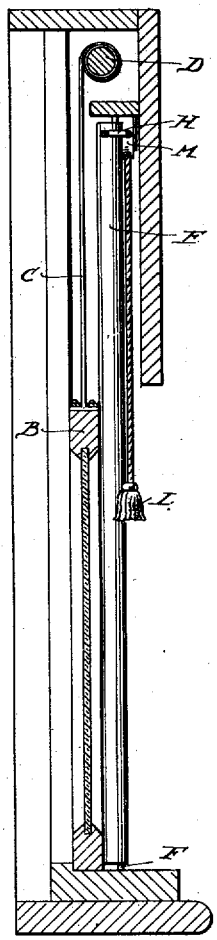
Figure 3:
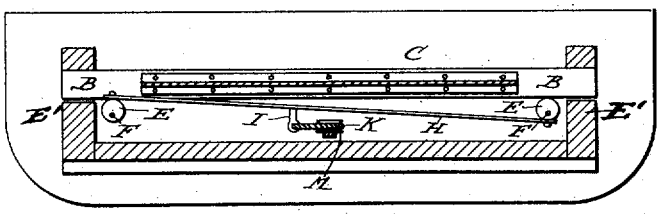
Figure 4:
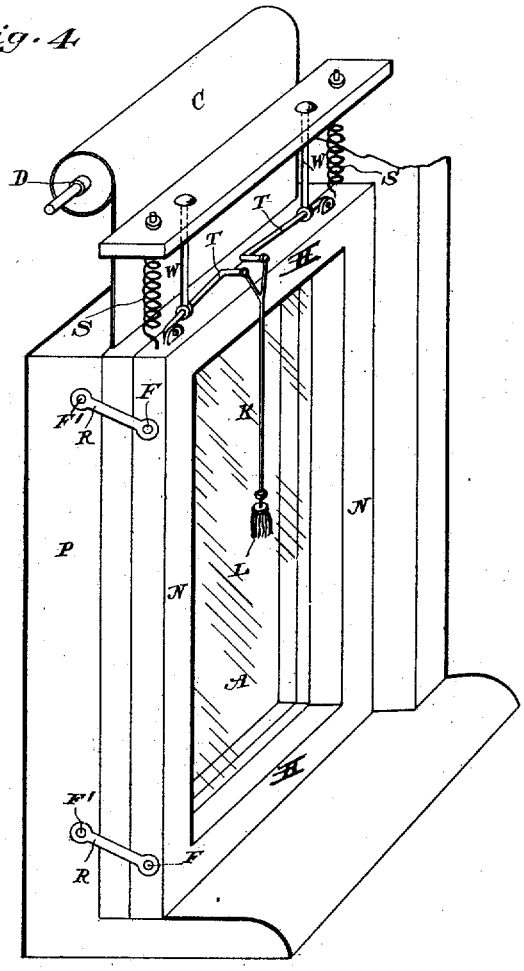

In the drawings, Figure 1 is a front elevation of my improved window. Fig. 2 is a vertical sectional view at line *y y* of Fig. 1. Fig. 3 is a cross-sectional view at line *x x* of Fig. 1. Fig. 4 is a perspective view of a modification.

Like letters of reference wherever they occur indicate corresponding parts in all the figures.

I have shown my device as applied to a railway-car; but it is obvious that it may be used with any kind or style of window.

A is the glass, and B the sash, of the window. The sash is arranged to slide in the usual manner, and is provided with a band C, secured to the top and passing over a spring-roller D, located above the sash. The spring should be of sufficient strength to overcome the weight of the sash when the same is free to move. I have shown a spring-roller for raising the sash; but it is obvious that weights may be employed, if desired, without departing from the spirit of my invention.

Referring to Figs. 1, 2, and 3, it will be observed that the usual stops are dispensed with, and in their stead two rollers or stops E, having rounded edges, are employed, forming movable stops that can be moved to and from the sash to hold the sash in place and release it from such holding action, which movable stops are arranged one at each of two edges of one side of the sash. These strips or movable stops are supported by and arranged to turn upon eccentric bearings or pivots F, working in a stationary part of the structure adjacent to the sash, and are provided with springs G, which are connected to the movable stops to hold them against the two edges of one side of the sash, and also to hold the opposite side of the sash in contact with the stationary stops E′, which are arranged opposite the stops E. The movable stops or strips E, as herein shown, are connected together by a bar H, provided with an arm I, to which is attached an operating-cord K, passing over a pulley M and terminating at a tassel L, by means of which the movable stops are withdrawn or released from contact with the sash, at the same time releasing the sash from contact with the stationary stops, against which it is held by the action of the spring or springs on the movable stops.

The operation of my device is as follows: When the sash is down, as shown in Figs. 1 and 2, it is held in place by its contact with the movable and stationary stops, the former pressing it against the latter sufficiently for this purpose. In order to free the sash from the holding action of the stops, so as to permit it to rise easily, it is only necessary to draw downward upon the cord K. This will cause the movable stops E to turn or move together on their pivots, drawing said stops away from contact with the sash, releasing the latter from contact with the stationary stop and permitting the sash to automatically rise to any desired position within its range of movement. In order to draw the sash downward, the cord is pulled so as to release the sash from the contact of the stop, and the sash is then pushed down by hand.

In the modification shown in Fig. 4 the window-stops N are shown as a square frame, pressing against the sash when closed on all four sides, and thus forming movable stops, which are connected together by the bars H′ H′, which form the top and bottom portions of the frame and are arranged one at each of the two vertical edges of one side of the sash. These stops N are pivoted to the frame P, which is stationary and serves as stops against which the movable stops hold the sash by means of inclined bars R and pivots F′, which movable stops are held down in contact with the sash by springs S, which are connected to the movable stops N, and they bear or press against them. The springs S hold the stops N in contact with the sash and the sash in contact with the stationary stops or frame P, so that both sets of stops are in contact with the sash. They are also of sufficient strength to cause the movable stops to hold the sash in the desired position against the action of the spring or weight of the roller D and the tendency of the stops to move away from the sash on the initial movement of the latter in the direction which the roller D acts to move it. T T are bars pivoted to the top of the movable stops N, passing through supports W and engaging with the manipulating-cord K, by means of which the stops are withdrawn from contact with the sash. This device is operated the same as that already described. By pulling the cord K the movable stops N are raised slightly and thrown outward and out of contact with the sash through the medium of bars R, allowing the sash to automatically raise or to be lowered. It will be observed that the movable stops N move with the initial movement of the sash upon an attempt to close down the window when once it is raised, and that this initial movement of the stops and sash together causes the stops to be brought into closer contact with the sash, and thus the window is held from being closed down until the cord K is manipulated so as to withdraw the stops away from and out of contact with the sash, thus releasing the latter from the stops, when the window is permitted to move in the same direction and to be lowered or closed by the hand.

Having now fully described my invention, what I claim as new therein, and desire to secure by Letters Patent, is—

1. The combination, with a window-sash provided with means for automatically raising the same, of movable stops normally bearing against the sash, substantially as shown and described.

2. The combination, with a window-sash provided with means for automatically raising the same, of stops pivoted at the sides thereof and arranged to be withdrawn from or pressed against the sash, substantially as shown and described.

3. The combination, with a window-sash provided with means for automatically raising the same when released, of a cord connected with a movable stop mechanism arranged to be withdrawn from or pressed against the edges of the sash, substantially as and for the uses and purposes shown and described.

4. The combination, with a window-sash provided with means for automatically raising the same, of stops eccentrically mounted at the sides thereof, substantially as shown and described.

5. The combination, substantially as set forth, of a sash, two movable stops arranged one at each of two edges of one side of the sash, a spring or springs, and means connecting the two stops together, whereby the movable stops are held in contact with the side of the sash by the spring or springs and are moved together by the connecting means.

6. The combination, substantially as set forth, of a sash, two movable stops arranged one at each of two edges of one side of the sash, a spring or springs pressing the stops against the side of the sash, and means for moving the stops together against the stress of the spring or springs, whereby the movable stops are held in contact with the side of the sash by the spring or springs and the sash is relieved from such contact.

7. The combination, substantially as set forth, of a sash, two pivoted movable stops arranged one of each at each of two edges of one side of the sash, two stationary stops arranged at corresponding edges of the opposite side of the sash, and a spring or springs whereby the sash is held in contact with both the movable and stationary stops.

8. The combination, substantially as set forth, of a sash, two movable stops arranged one at each of two edges of one side of the sash, two stationary stops arranged at corresponding edges of the opposite side of the sash, a spring or springs, and means connecting the movable stops together, whereby the sash is held in contact with both the movable and stationary stops and the movable stops are moved together to release the sash from such contact.

9. The combination, substantially as set forth, of a sash, two pivoted movable stops arranged one at each of two edges of one side of the sash, a spring or springs, and means connecting the stops together, whereby the movable stops are held in contact with the side of the sash by the spring or springs and are moved on their pivots by the connecting means.

10. The combination, substantially as set forth, of a sash, two pivoted movable stops arranged one at each of two edges of one side of the sash, a spring or springs, and means for moving the stops together against the stress of the spring or springs, whereby the movable stops are held in contact with the side of the sash by the spring or springs and the sash is released from such contact.

11. The combination, substantially as set forth, of a sash, two movable stops arranged one at each of two edges of one side of the sash and to move with the initial movement of such sash, a spring or springs arranged to press the stops against the side of the sash, and means for moving the stops together against the stress of the spring or springs, whereby the sash is held by the stops from moving in one direction and is released from the stops to permit it to move in the same direction.

OLIVER M. EDWARDS.

Witnesses:
S. J. QUAILE,
JOHN L. GETMAN.